United States Patent [19]

Ishikawa et al.

[11] Patent Number: 5,502,778
[45] Date of Patent: Mar. 26, 1996

[54] IMAGE DATA COMPRESSION METHOD FOR APPLYING DIFFERENT COMPRESSION RATIOS TO DIFFERENT PORTIONS OF AN IMAGE

[75] Inventors: Ken Ishikawa, Matsudo; Shinichiro Miyaoka, Kawasaki, both of Japan

[73] Assignees: Hitachi, Ltd.; Hitachi Medical Corporation, both of Tokyo, Japan

[21] Appl. No.: 834,595

[22] Filed: Feb. 12, 1992

Related U.S. Application Data

[63] Continuation of Ser. No. 508,590, Apr. 13, 1990, abandoned.

[30] Foreign Application Priority Data

Apr. 17, 1989 [JP] Japan ................................ 1-095124

[51] Int. Cl.$^6$ .................................................. G06K 9/00
[52] U.S. Cl. ............................................ 382/239; 358/433
[58] Field of Search .................................... 382/6, 56, 239, 382/261; 358/136, 429, 431, 433, 447, 463, 467; 364/413.22

[56] References Cited

U.S. PATENT DOCUMENTS

| | | | |
|---|---|---|---|
| 4,797,944 | 1/1989 | Tanaka | 382/56 |
| 5,163,104 | 11/1992 | Ghosh et al. | 382/56 |

*Primary Examiner*—Leo Boudreau
*Attorney, Agent, or Firm*—Antonelli, Terry, Stout & Kraus

[57] ABSTRACT

An image data compression method is disclosed, in which a sheet of image is divided into a plurality of partial images of small area, and in reconstructing an image, the fidelity to the original image is changed in accordance with the utility of the information contained in each partial image, and the image data is compressed in accordance with the particular fidelity.

4 Claims, 5 Drawing Sheets

IMAGE DATA COMPRESSION METHOD FOR APPLYING DIFFERENT COMPRESSION RATIOS TO DIFFERENT PORTIONS OF AN IMAGE

This is a continuation of application Ser. No. 508,590, filed Apr. 13, 1990, now abandoned.

BACKGROUND OF THE INVENTION

The present invention relates to a data compression method for reducing the amount of large-volume image data such as a medical X-ray image data, or more in particular to an image data compression method which is capable of storing information of high utility better than information of low utility and in which the information of high utility is compressed with higher ratio than that of low utility.

Conventionally, the information of medical X-ray image generated in medical institutions or the like, for example, have been used and stored as an X-ray film. In recent years, however, in order to reduce the storage space or facilitate picture search thereof, or to process an image by use of an image processing technique, an image processing system has been under development for reading an X-ray film image optically, converting it into a digital electrical signal by photoelectric conversion means and analog-digital conversion means, and storing it in a memory unit like an optical disk or subjecting it to an image processing computation by electronic computer.

Such an image processing system according to the related art, as described in the specification of JP-A-61-231 and shown in FIG. 4, comprises a film image reader 1 for converting an X-ray film image data into a digital signal and an image processing unit body 2. In the drawing, an output digital signal of the film image reader 1 reaches an image processing section 4 through a measurement interface 3 in the image processing unit body 2. The output digital signal is subjected to a measurement process for converting the information on light intensity to a density data at the image processing section 4, and is stored in a storage unit 7 including a magnetic disk unit, an optical disk unit, a large-capacity semi-conductor memory unit or the like. The image data thus stored is transferred to a display image memory 6 as required, and displayed as an image on an image display unit 9 directly connected to the memory 6. In the process, the image data may alternatively be transferred to the image processing section 4, and after being subjected to various image processing computations, may be transferred to the display image memory 6. The image memory 5 is for storing the image data temporarily at the time of the measurement processing or the image processing computation of the data by the image processing section 4. The whole of this image processing unit is operated by an I/O unit 10 connected to the image processing unit body 2 via an I/O unit interface 8.

The capacity of the image data handled in this image processing unit reaches as much as approximately 10M byte for each sheet of X-ray film. An enormous storage capacity would thus be required if the data are to be stored in their direct form. In this image processing unit, therefore, the data is compressed and stored in the storage unit 7 by use of various data compression methods including a coding method by dividing an image into uniformly sized blocks (hereinafter referred to as "the non-uniform block coding" as discussed in "The Preliminary Texts for the 1987 National Conference in Commemoration of the 70's Anniversary of the Institute of Electronics, Communications and Information Engineers of Japan" (published 1987, at pp. 5 to 50). The conventional image processing unit shown in FIG. 4 is so configured that the image data compression is effected by an image processing section 4 using an image memory 5, and the processing time is shortend by a configuration in which the image data compression process may be effected in parallel to the processes for data measurement and compilation and transfer of the image to the display image memory 6.

In the image data compression effected in this conventional image processing unit, an irreversible data compression method such as a non-uniform block coding is often used in order to increase the compression ratio. If an attempt is made to obtain a high compression ratio, therefore, the fidelity of the reproduced image information reconstructed from the compressed data as compared to the original image information is necessarily reduced.

The irreversibility means that when a compressed data is reproduced, a reproduced image cannot be completely reproduced and has error in comparison with original image.

The non-uniform block coding is a method in which portions of the image with a small optical density (brightness) change unified in a large block and portions of the image with a large optical density change unified in a small block. The interior of each block is approximated by a bilinear function, with the form of block division described by a quad-tree.

With regard to the image data handled by the image processing unit, the values of the image data providing important information are not distributed uniformly over the range of available values in many cases but limited to a region of specific values therein.

In the case of a medical X-ray film image handled by the conventional image processing unit shown in FIG. 4, in which a local density of the film is read out as an image data, for example, the important information is often included in the values in the region from low to middle densities. This is due to the fact that a film is exposed in such a manner as to contain important medical information in the region from low to middle density high in visual ability of the observer to discriminate the density. The low-density region, in particular, contains an image of internal organs superimposed one on another, and a minor density deference in the low-density region often provides important information indicating the edges of superimposed organs. The high-density, on the other hand, often contains useless information such as the direct X-ray and its scattered beam or a noise of the film image reader 1.

As mentioned above, the conventional irreversible data compression method poses the problem that since the important and useless information are compressed without being discriminated but with a substantially uniform fidelity, the important information may be dropped while useless information may be stored.

SUMMARY OF THE INVENTION

The object of the present invention is to provide a data compression method capable of solving the above-mentioned problem.

In many irreversible image data compression methods like the above-mentioned non-uniform block coding, in order to increase the processing speed, an object image 11 is divided into a multiplicity of partial images 12, and data compression is effected for each partial image 12. Also, generally, the irreversible image data compression method has a parameter affecting the degree of compression, so that the fidelity is deteriorated if an attempt is made to increase the compression ratio by changing this parameter for the same image. In the method of non-uniform block coding, the tolerance of distortion expressed by the local square sum of errors from the original image with the compressed image data reproduced corresponds to such a parameter. With the increase in the tolerable distortion value, the compression ratio increases, so that the amount of the compressed data is reduced while the fidelity is deteriorated. In the case of data compression for each partial image 12, the parameter such as the tolerable distortion affecting the fidelity is often capable of being changed for each partial image 12.

In an image data compression method according to the present invention, taking the aforementioned facts into consideration and in order to achieve the above-mentioned object, such a parameter as the tolerable distortion which affects the fidelity is determined as a function of an image data value representing a particular partial image. The image data value is, for example, the mean value of the image data of the partial image 12. The parameter takes a value such that the reproduced image has high fidelity of a small tolerable distortion in the case where the particular image data value is included in a region having a local information high in utility, such as a region from low to middle density in an X-ray film image.

The operation of an image data compression method according to the present invention will be explained with reference to the case of an X-ray film image shown in FIG. 5 as an example. The image data in a partial image 12 contained in a portion 13 with internal organs superimposed one on another often assumes a value equivalent to a low or middle density, and the image data value representing the partial image 12 also takes a value equivalent to a low or middle density. With regard to this portion, therefore, a parameter value is selected for effecting an image data compression high infidelity but low in compression ratio. On the other hand, the image data in the partial image 12 contained in a portion 14 exposed by direct X-ray and its scattered beam in FIG. 5, often take a value equivalent to a high density, and the image data value representing the partial image 12 in this case also takes a value equivalent to a high density. With regard to this partial image 12, therefore, a parameter is selected by which an image data compression is effected with a low fidelity but a high compression ratio. As a result, according to the method of the present invention in which a parameter is changed for each partial image, as compared with a conventional method using a fixed parameter for the whole image, the compression ratio being the same for both the methods, there is less information drops and useless information is removed, thereby permitting an image data compression more desirably meeting the degree of importance of information.

DESCRIPTION OF THE PREFERRED EMBODIMENTS

An embodiment of the present invention will be explained in detail below with reference to the accompanying drawings.

Figure 4:
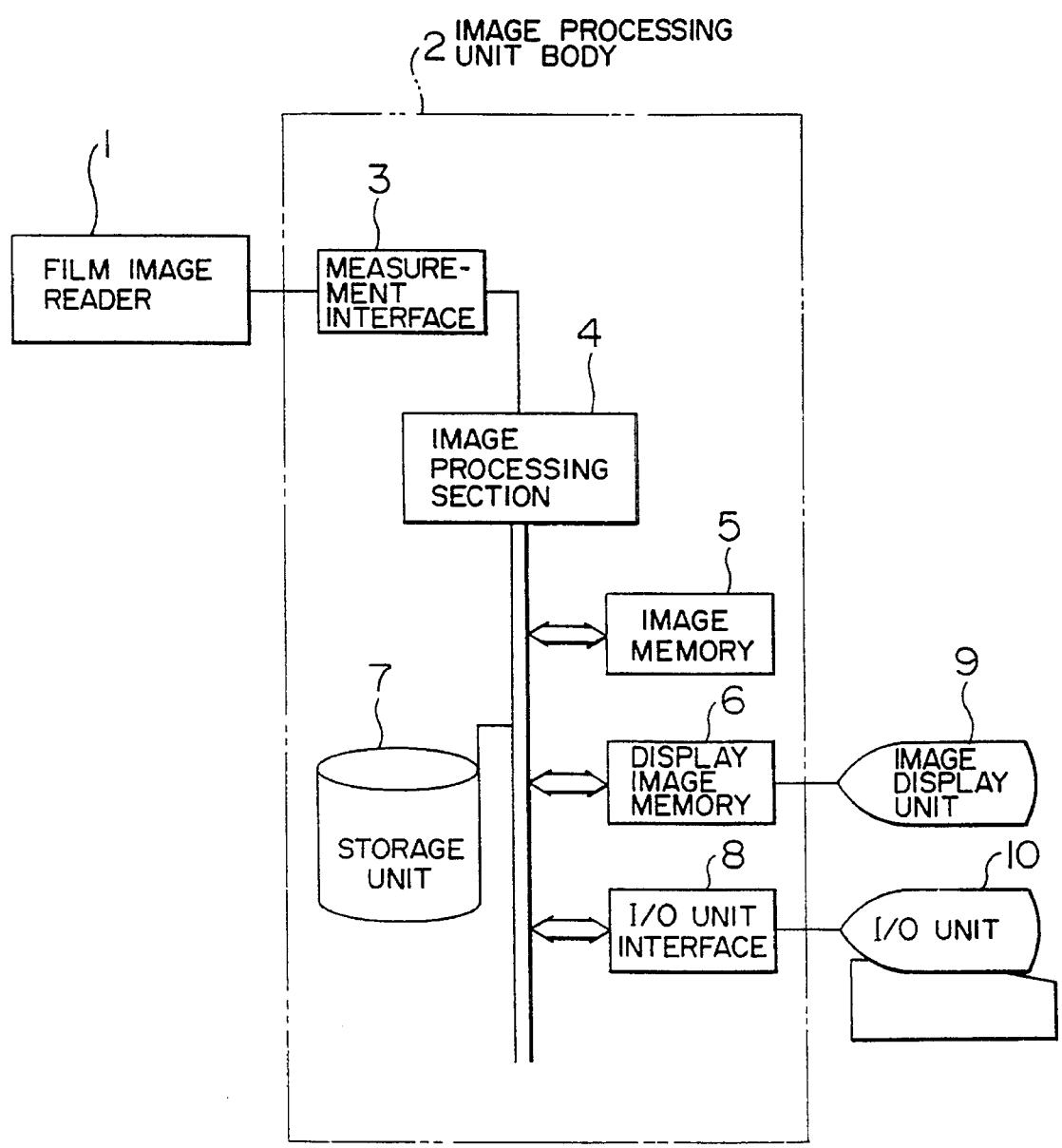
FIG. 4 is a block diagram showing a configuration of an image processing system for implementing methods according to the present invention and the prior art.
Figure 5:
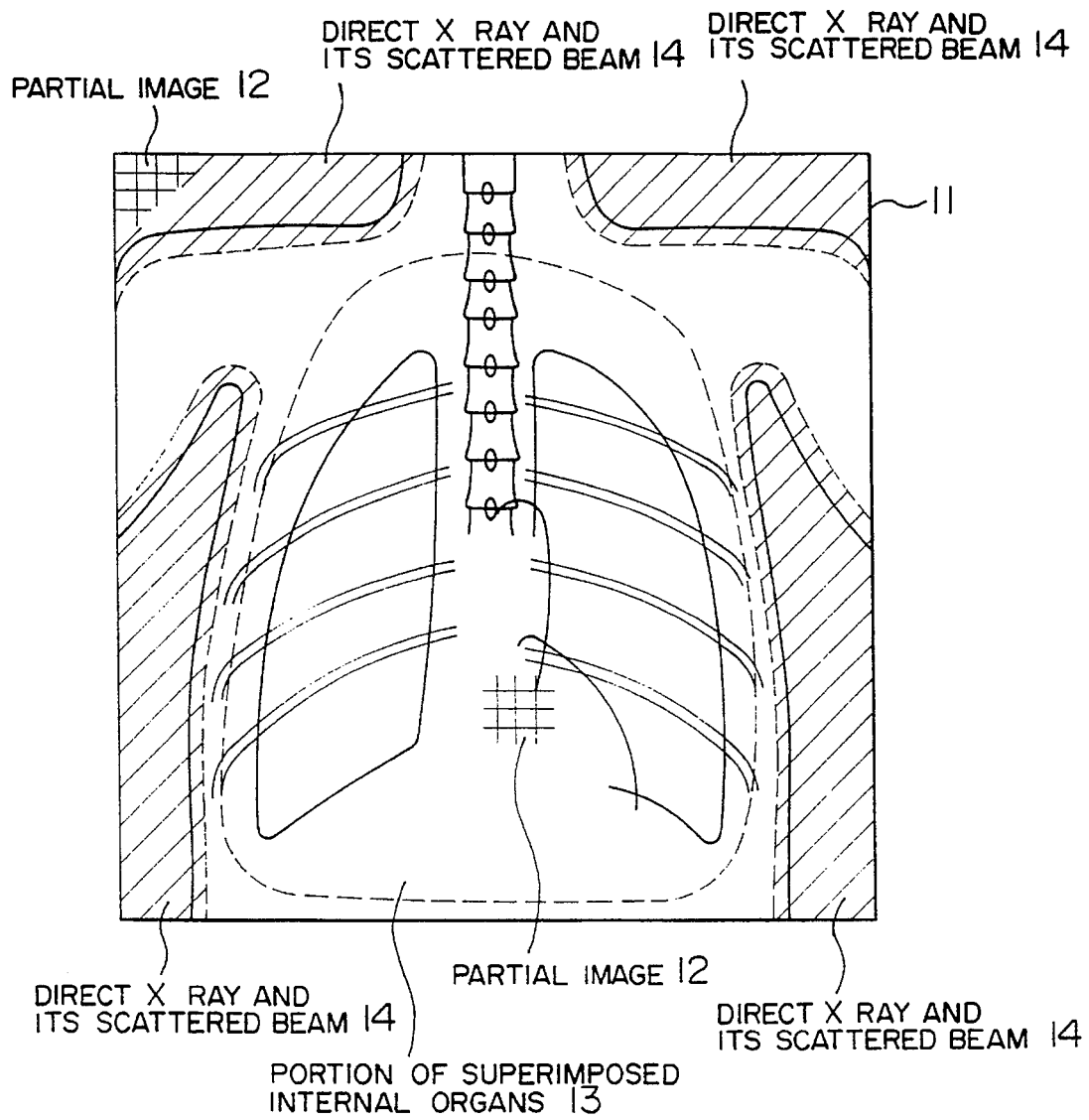
FIG. 5 is a model diagram showing an example of an X-ray image aimed at by an image processing system for implementing methods according to the present invention and the prior art and the handling thereof at the time of data compression.

In an image data compression method according to the present invention, the amount of a large-capacity original image data such as a medical X-ray image data is reduced. This method is implemented by use of the same image processing system as in the prior art shown in FIG. 4. For compressing a partial image, the above-mentioned non-uniform block coding is used, and a microprocessor built in an image processing section 4 in an image processing system implements the method using a working RAM built also in the section 4.

Figure 3:
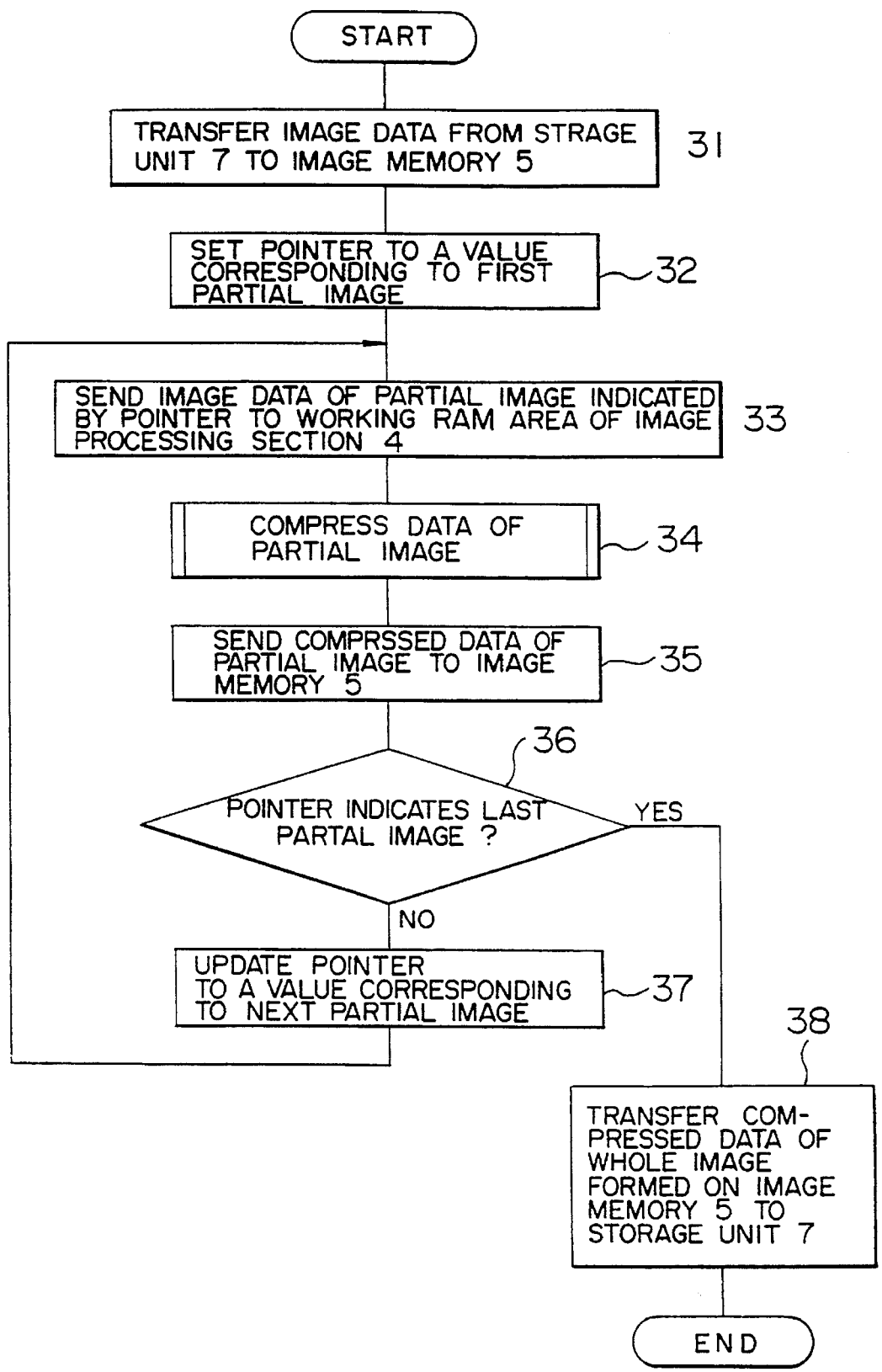
FIG. 3 is a flowchart of processing steps for data compression against the whole of an image according to an embodiment of the present invention.

The data compression against the whole of an X-ray image sheet is implemented in accordance with the flowchart of FIG. 3.

Specifically, as an initial process, an image data of an object image is transferred from a memory unit 7 to an image storage 5 (step 31), and a pointer indicating the partial image to be processed is rendered a value equivalent to the first partial image (step 32). The X-ray image data covered by the present embodiment has 2048×2048 pixels, which are divided into small square regions each with 16×16 pixels handled as a partial image. Also, the partial images are processed from left to right and from the top downward sequentially.

Next, the processing of each partial image is started. First, the image data of the partial image designated by the pointer is sent to the working RAM area of the image processing section 4 (step 33). Then, the data compression is effected of the partial image following the flowchart of FIG. 1 described later (step 34), and the compressed data of the partial image thus prepared is sent to an image memory 5 from the working RAM area (step 35). The compressed data is accumulated closely in accordance with the serial number of the partial images in the image memory 5. Next, it is decided whether the pointer indicates the final partial image (step 36), and if the pointer indicates so, the post-process is entered, and otherwise, the pointer is updated to a value corresponding to the next partial image (step 37) to effect the processing for each partial image again.

Finally, as a post-processing, the compressed data of the whole image formed on the image memory 5 is transferred to the storage unit 7, thus terminating the image data compression of a sheet of X-ray image (step 38).

Figure 1:
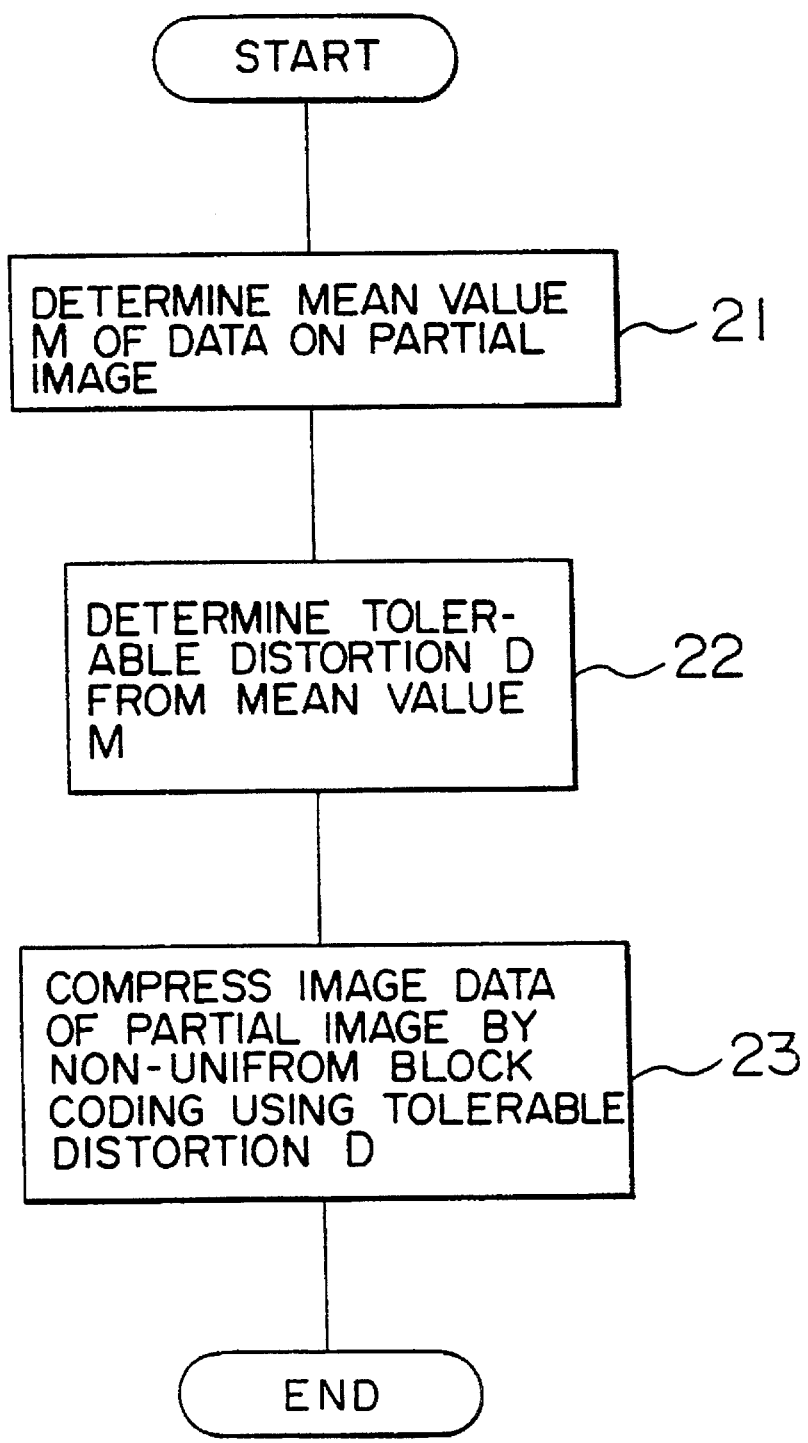
FIG. 1 is a flowchart of processing steps for effecting data compression of a partial image according to an embodiment of the present invention.
Figure 2:
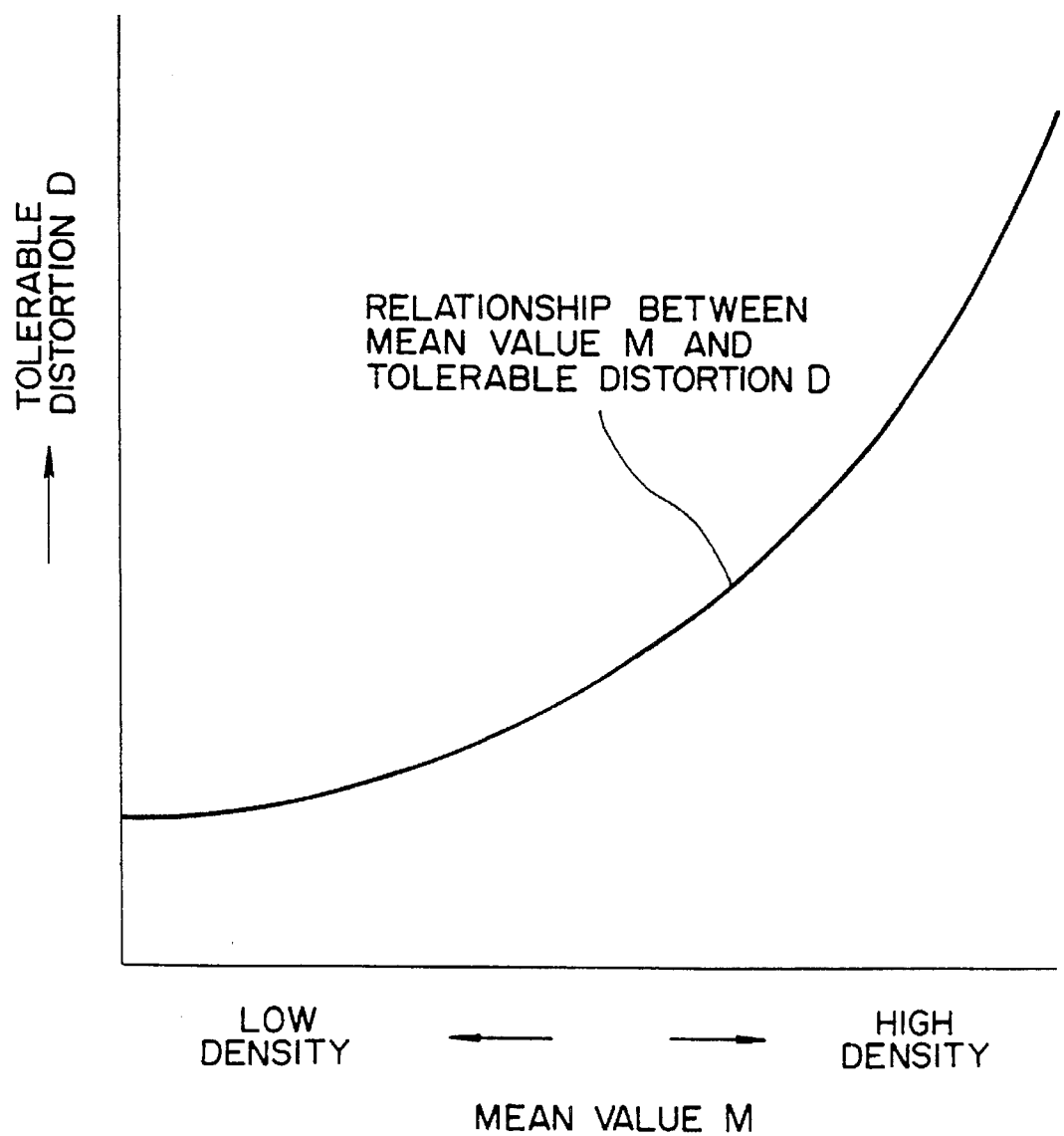
FIG. 2 is a graph showing an example of the relationship between mean value M and tolerable distortion D according to an embodiment of the present invention.

According to the present invention, the data compression of the partial image is effected by the microprocessor in the image processing section 4 by use of a working RAM area in accordance with the flowchart of FIG. 1. Specifically, first, a mean value M of the image data of the partial image is determined as a data value representing the partial image (step 21).

Then, a tolerable distortion D providing a parameter for the non-uniform block coding method is determined from the mean value M (step 22). According to the present embodiment, D is calculated from M in accordance with the quadratic equation $$D = aM^2 + bM + c$$

where a, b and c are parameters changed in accordance with where the useful information locally exists in the range of values assumable by the image data. The coefficients a, b and c are determined on the basis of relations of the tolerable distortions and the desired quality of the reproduced image. Each of the tolerable distortions is determined from a plurality of density regions such as low, medium and high density regions. The coefficients a, b and c are set such that a plurality of lines representing the tolerable distortion are smoothly connected. Normally, the value of D is small when M assumes a value equivalent to low density, while it is enlarged when M assumes a value corresponding to a high density, the M dependability being set to form a downwardly, convex curve. By doing so, when M takes a value equivalent to low to middle density containing much useful information normally, D is reduced, thus permitting a data compression with superior fidelity. When M assumes a value corresponding to a high density, on the other hand, D is increased, and therefore the data compression of high compression ratio is effected although fidelity is low.

Next, by use of the value of the tolerable distortion D determined this way, the image data of the partial image involved is compressed by the non-uniform block coding method (step 23).

In the above-mentioned data compression of the partial image, the mean value M of the image data for the partial image is a value used originally in the non-uniform block coding, and therefore the portion of step 22 for determining the tolerable distortion D from the mean value M in the flowchart of FIG. 1 is the one added by the present invention to the process of the non-uniform block coding with the value D fixed in the prior art.

In reconstructing a reproduced image from the compressed data prepared by the non-uniform block coding method used in the present embodiment, the value D is not used in the reconstruction computation, and therefore any value of D determined at the time of compression does not affect the algorithm of reconstruction computation at all. It is of course not necessary to insert the value D in the compression data. As a result, the reconstruction of the compressed data can be implemented according to the present embodiment by the process exactly identical to the reconstruction process with a fixed tolerable distortion D. (Refer to JP-A-61-306416)

An embodiment of the present invention, has been explained above. The present invention may of course be modified in various forms and is not limited to the above-mentioned embodiment. First, the irreversible image data compression method providing a base may assume various forms other than the non-uniform block coding mentioned with reference to the embodiment above. In the two-classification coding discussed in the NHK Technical Monthly, May 1985, at pp. 164 to 171, the threshold values $Th_1$ and $Th_0$ used in "mode selection 1" and "mode selection 2" in FIG. 6 at page 168 of the same reference correspond to the parameters affecting the fidelity and variable in value for each partial image. The present invention is applicable by handling one or both of these parameters as a function of an image data value representing a partial image. Also, in the discrete cosine transformation method discussed in Video Information (M), 18, 1986, at pp. 719 to 724, the present invention is applicable if one or both of the threshold value Th used for "disregarding the coefficients" in FIG. 1 at p. 720 of the same reference and the quantization accuracy q used for "quantization of the coefficients" are handled as a function of the image data value representing a partial image. Further, although the aforementioned embodiment uses a mean value in a partial image as an image data value representing the partial image, the maximum value, minimum value or median value in the partial image may alternatively be used on some occasions. Also, although the afore-mentioned embodiment uses a quadratic for determining a parameter value from an image data value representing a partial image, other forms of function such as a polygonal curve fuction designable freely by the user may be used, or a function relationship high in degree of freedom may be set by use of a look-up table.

We claim:

1. An image data compression method comprising the steps of:

a) dividing a plane of an image into a plurality of partial images;

b) determining a n-th representative value of pixel values of a n-th partial image by using the pixel values from said n-th partial image;

c) determining a n-th value for controlling fidelity of said n-th partial image for image reconstruction on the basis of a predetermined function using only said n-th representative value;

d) compressing image data of said n-th partial image by use of said n-th value for controlling fidelity;

e) storing the compressed image data; and f) applying steps (b) to (e) to all of the partial images to compress said image data.

2. An image data compression method according to claim 1, wherein the step of determining a n-th value for controlling fidelity includes the step of setting a n-th value for controlling fidelity in such a manner as to reconstruct said n-th partial image with high fidelity in a case where the representative value thereof is included in a region where information of high utility exists.

3. An image data compression method according to claim 2, wherein the step of determining the representative value includes the step of determining a mean value of said n-th partial image, and the step of determining a n-th value for controlling fidelity includes the step of determining a value representing a degree of distortion of said n-th partial image that occurs when said n-th partial image is reconstructed.

4. An image data compression method according to claim 2, wherein the step of compressing image data includes the step of compressing image data by the non-uniform block coding method.

* * * * *